Jan. 17, 1967  R. J. PETERSON ET AL  3,298,287
CARTONING MACHINE

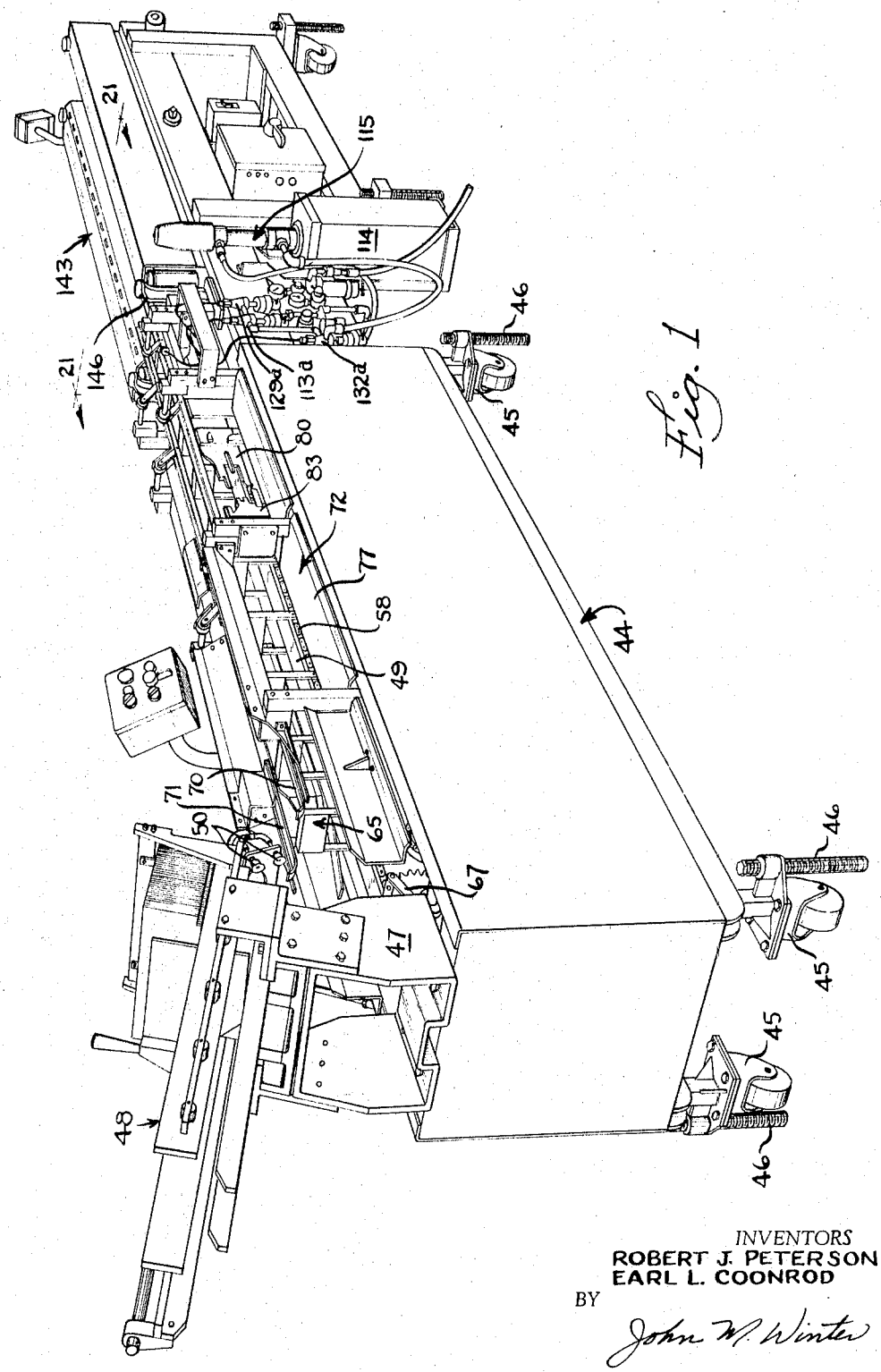

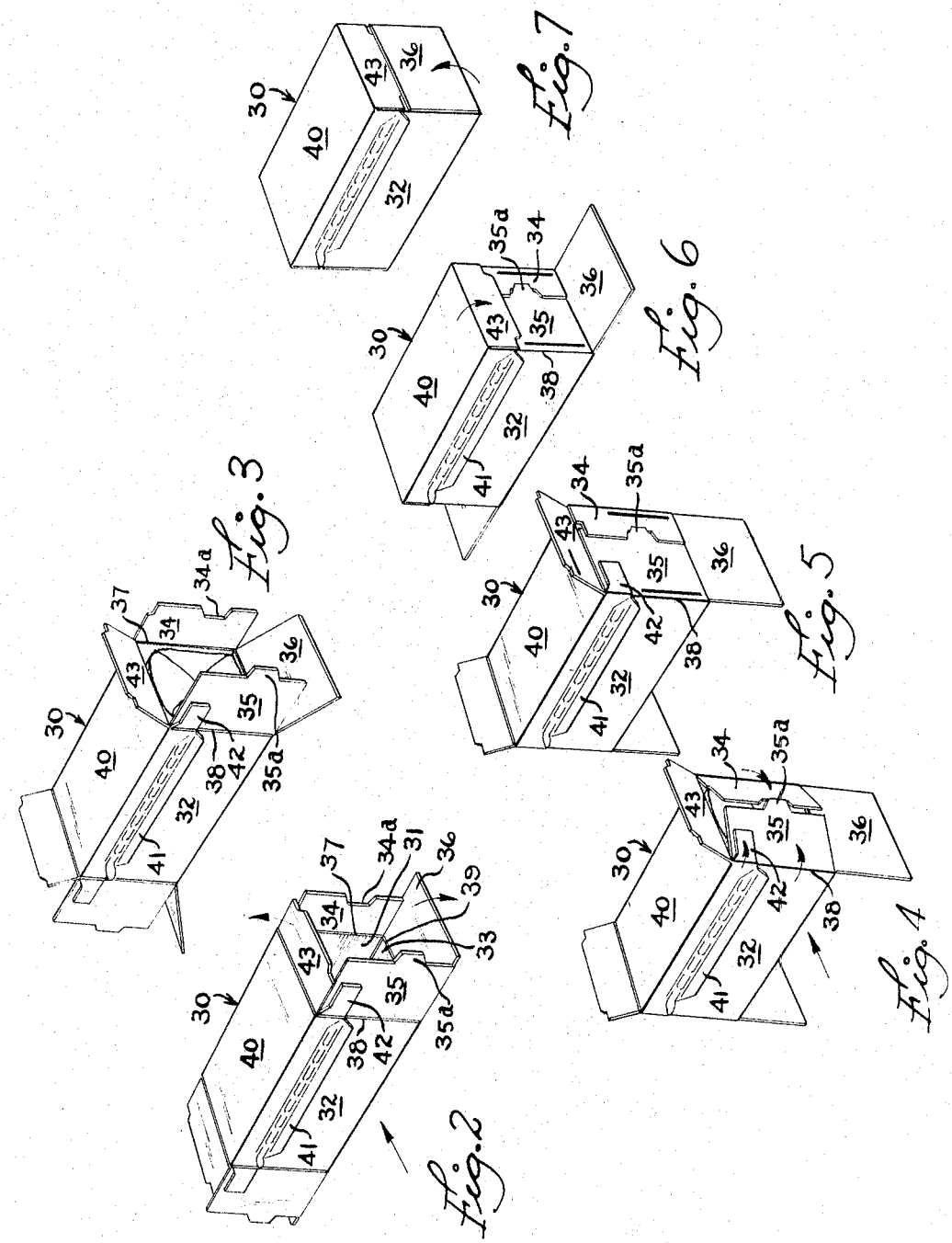

Filed Feb. 25, 1964  9 Sheets-Sheet 3

INVENTORS
ROBERT J. PETERSON
EARL L. COONROD
BY

John M. Winter

ATTORNEY

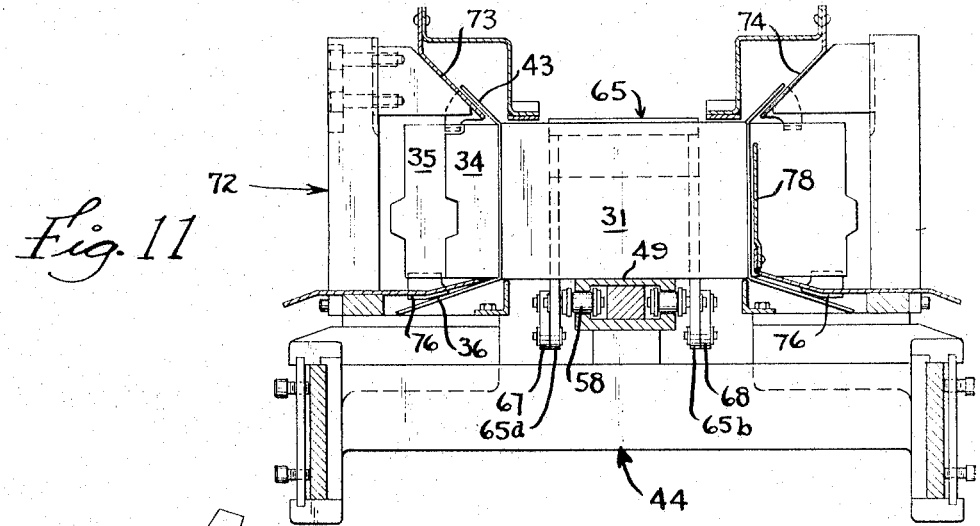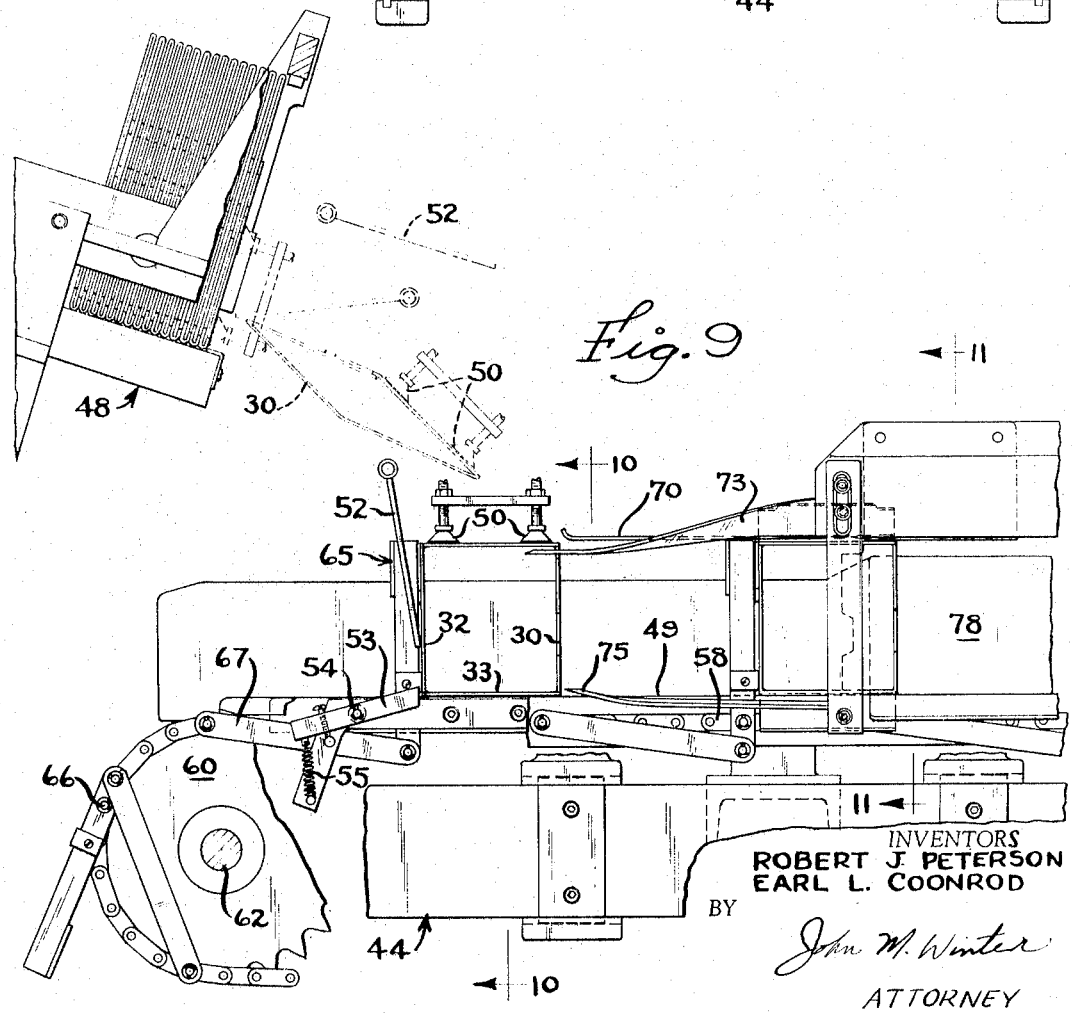

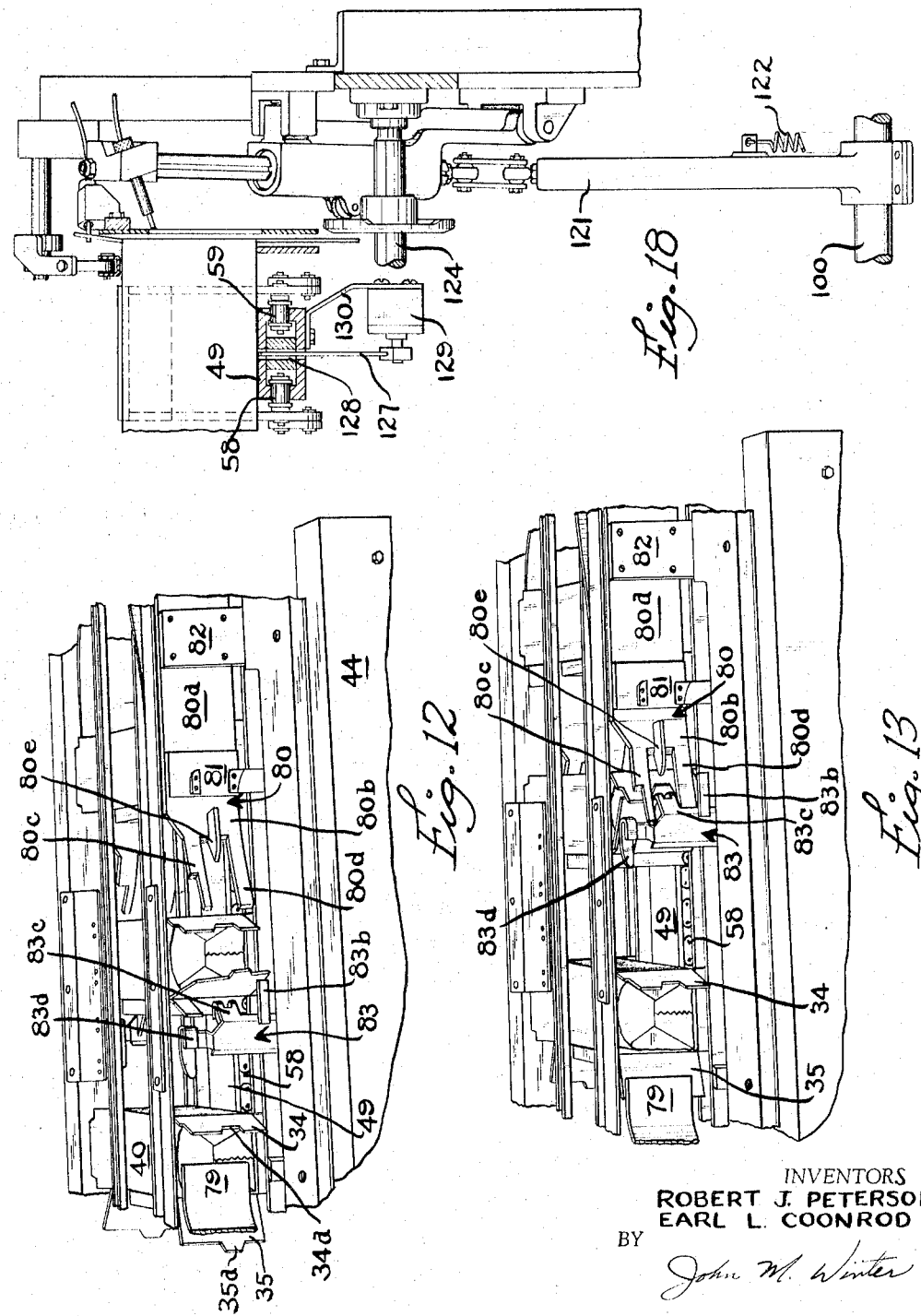

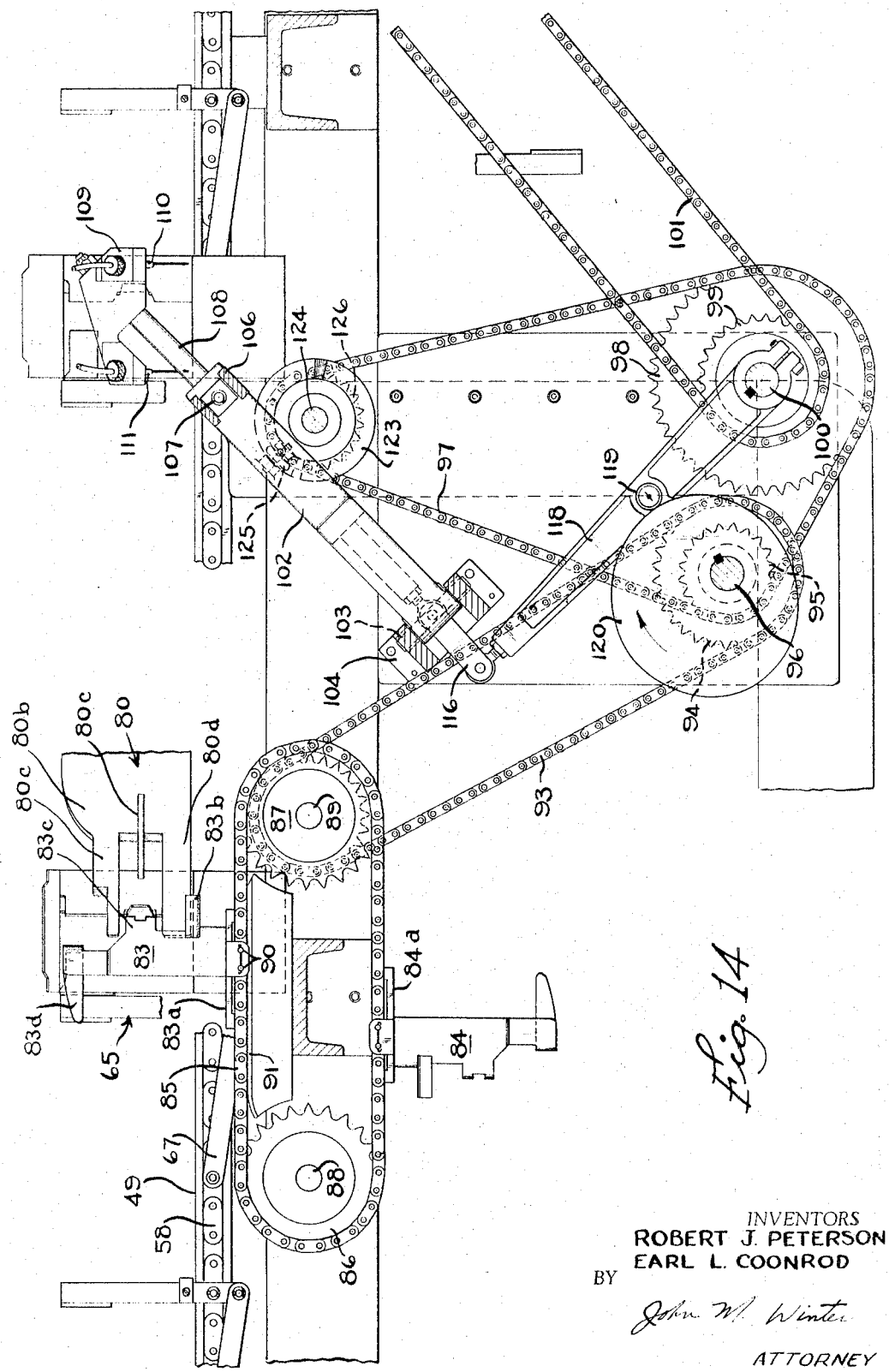

United States Patent Office 3,298,287
Patented Jan. 17, 1967

3,298,287
CARTONING MACHINE
Robert J. Peterson, Oshkosh, and Earl L. Coonrod, Neenah, Wis., assignors to American Can Company, New York, N.Y., a corporation of New Jersey
Filed Feb. 25, 1964, Ser. No. 347,165
15 Claims. (Cl. 93—49)

This invention relates generally to the formation of cartons from carton shells and more particularly to a method of and an apparatus for forming cartons and sealing same with an adhesive.

Conventionally, strips of adhesive are applied only in the direction of movement of the shell. It is often desired to apply strips of adhesive transversely of each other on a carton shell. This is now done by first applying a strip of adhesive parallel to the line of travel of the carton shell and then changing the direction of movement of the shell 90° and applying the second strip of adhesive, again parallel to the line of travel of the shell. The strips are thus disposed at a right angle to each other.

Another method of obtaining transversely disposed strips of adhesive is to move the carton shell on a straight line of travel but rotate the carton shell between the application of the first and second strip.

An object of this invention is to provide a new and improved method of and apparatus for forming and sealing cartons.

Another object of this invention is to provide a new and improved method of and apparatus for applying to a carton shell moving in a straight line path, a strip of adhesive traversely of the straight line path of said carton shell.

Another object of this invention is to provide a new and improved method of and apparatus for substantially simultaneously applying to a carton shell moving in a straight line path, strips of adhesive disposed traversely of each other.

Another object of this invention is to provide new and improved apparatus for interlocking the leading and trailing end flaps of a carton shell being moved along a straight line path.

Another object of this invention is to provide a new and improved method of and apparatus for tucking a portion of the trailing end flap inside of the leading end flap of a carton shell moving in a straight line path as the leading end flap is swung from a transverse position to a position substantially paralleling the straight line path of the shell and for applying strips of adhesive to said end flaps transversely of the straight line path of the shell.

Figure 8:
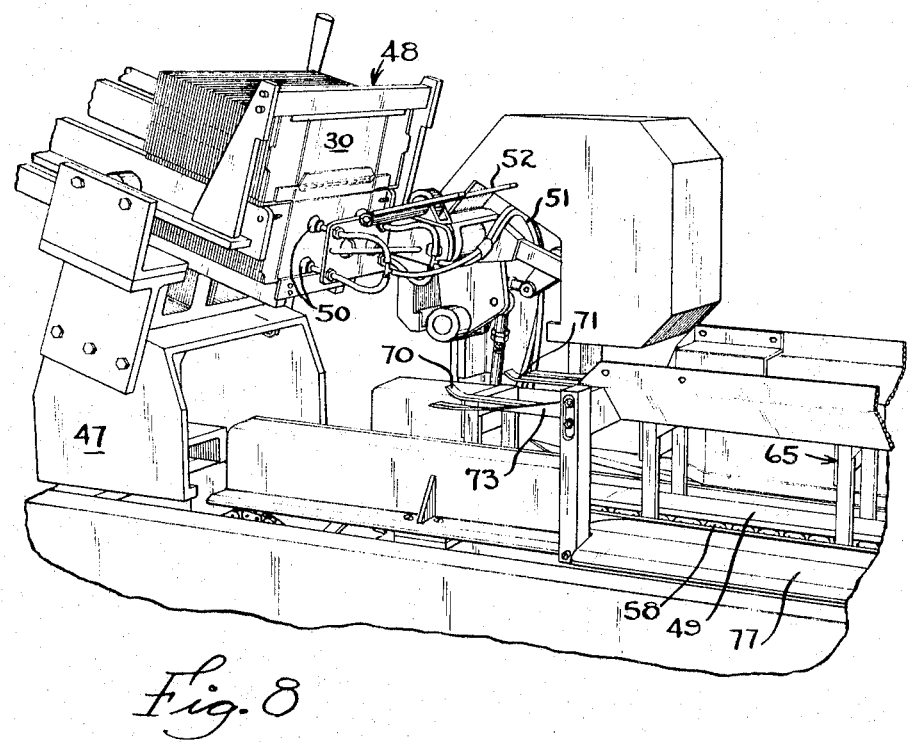
Figure 10:
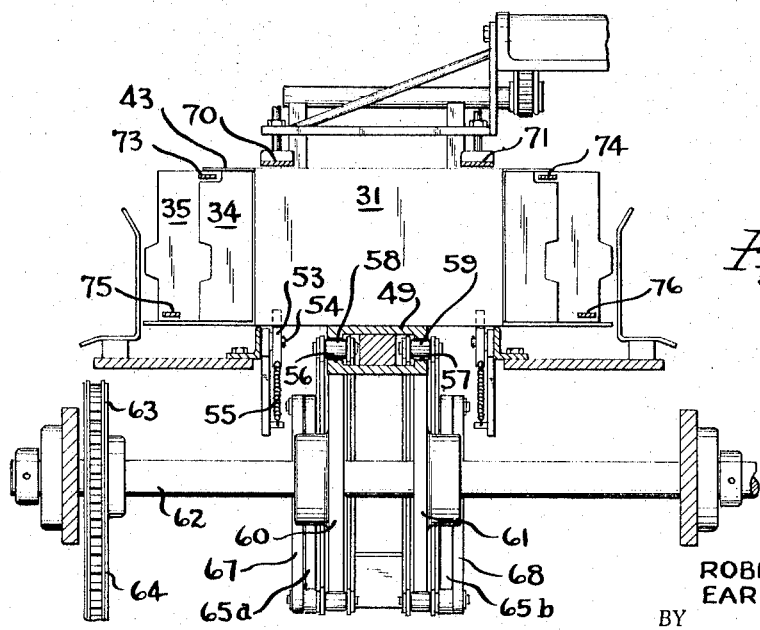
Figure 15:
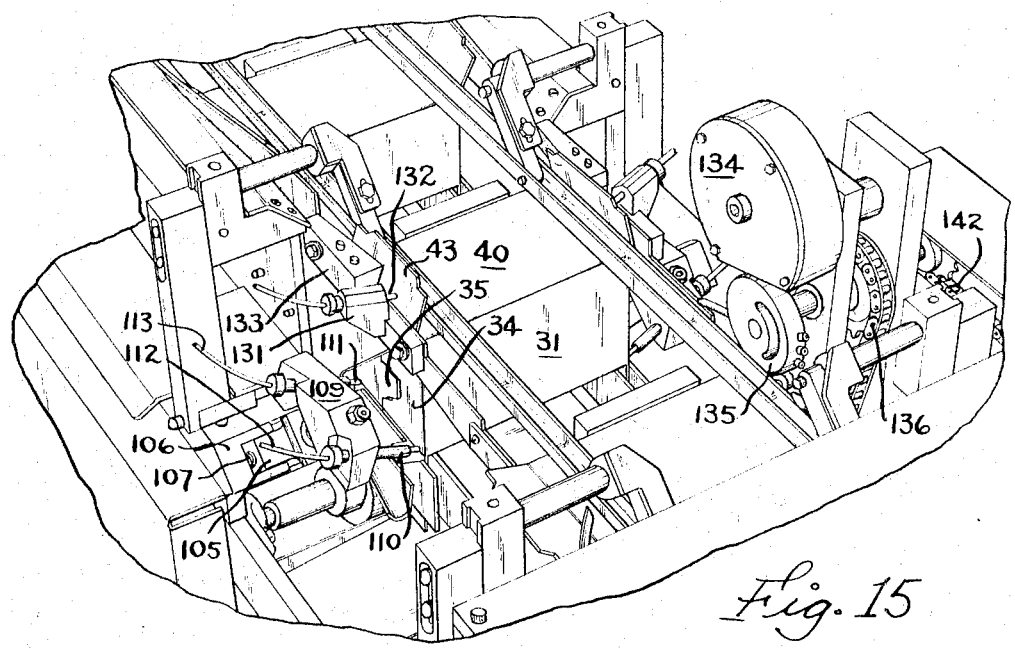
Figure 16:
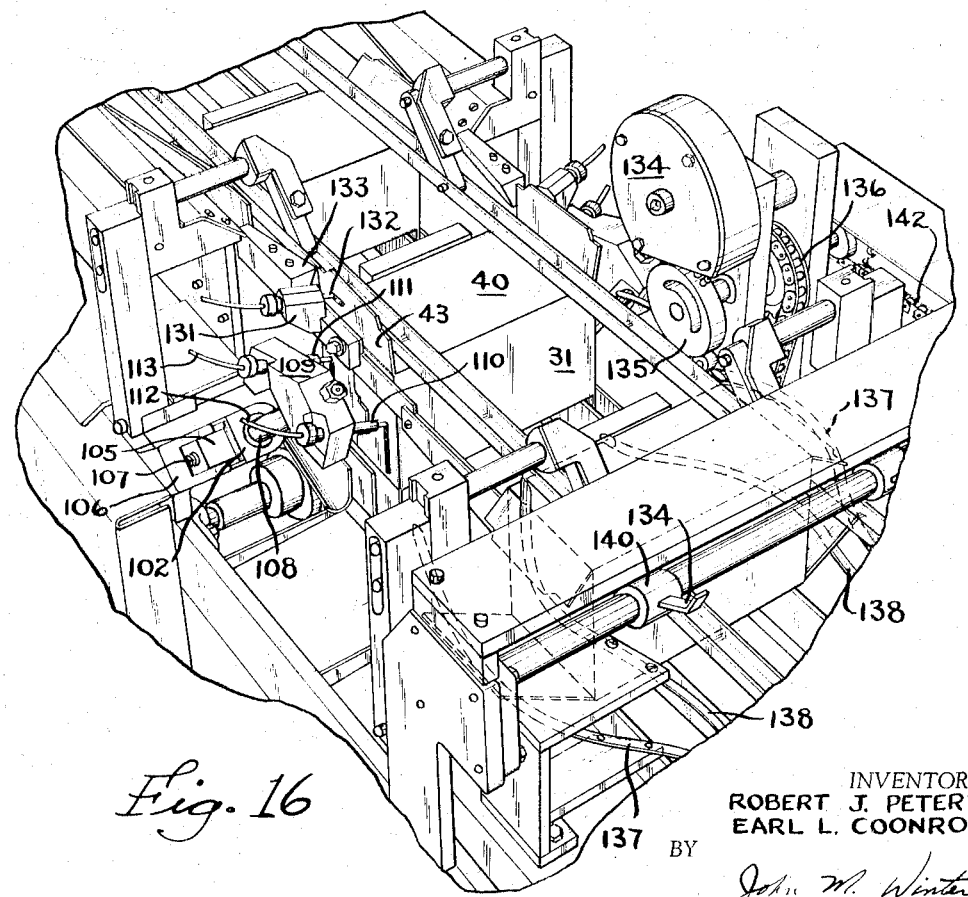
Figure 17:
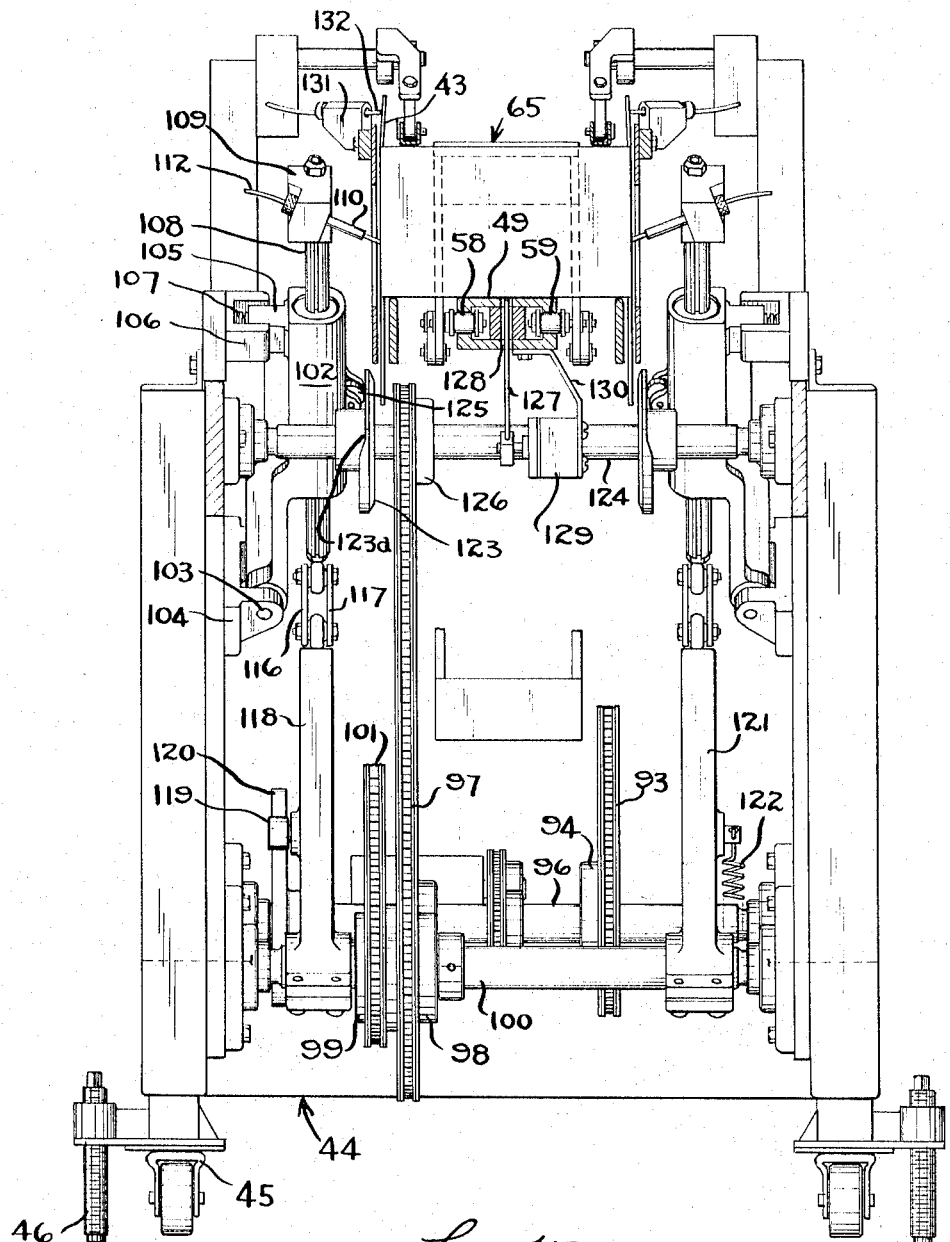
Figure 19:
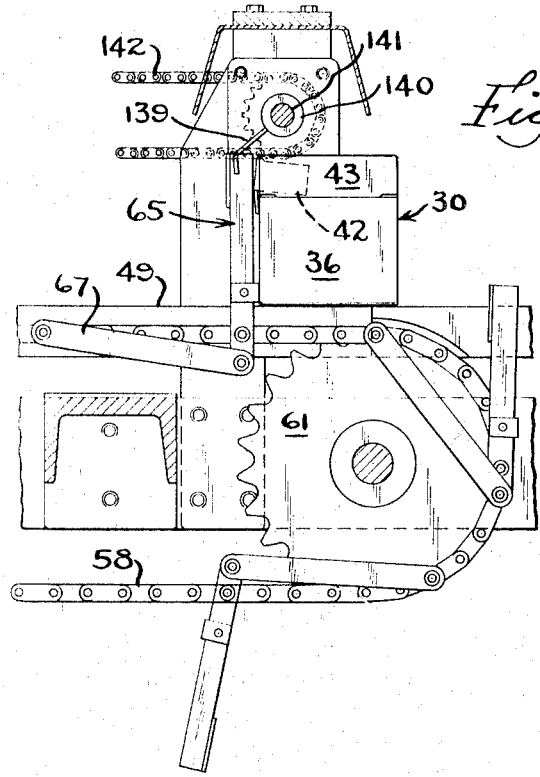
Figure 20:
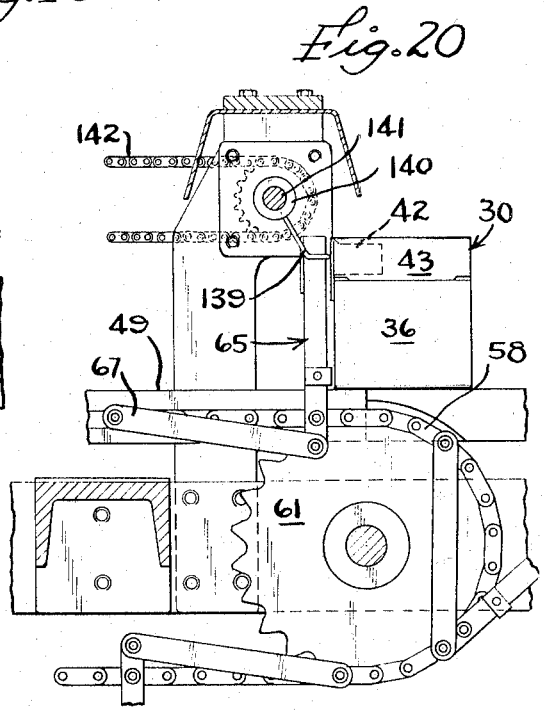
Figure 21:
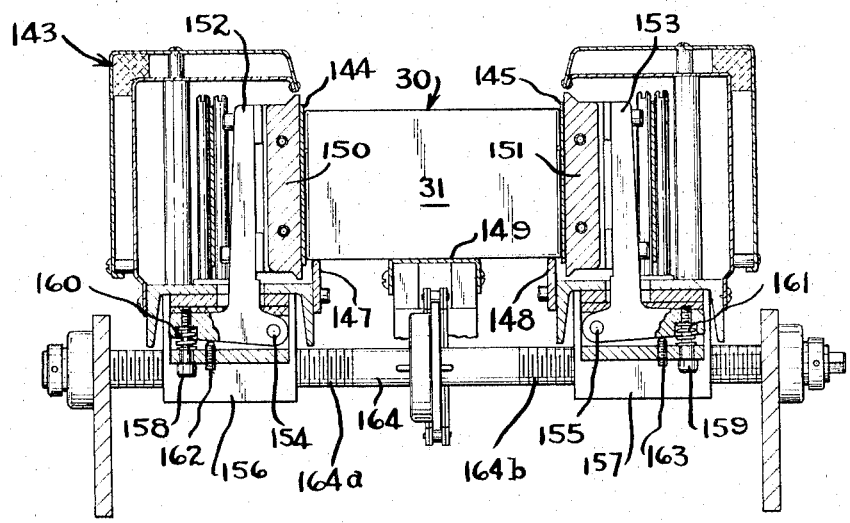

Further objects and advantages of this invention will become apparent from the following detailed description made in connection with the accompanying drawings in which:

FIGURE 1 is a perspective view of a cartoning machine embodying our invention,

FIGURES 2–7 are perspective views of a carton shell shown in stages a–f of formation, FIGURE 8 is a perspective view of a shell hopper and feed device of a cartoning machine embodying our invention, FIGURE 9 is a fragmentary side elevational operating view of a cartoning machine embodying our invention, partially in phantom and with portions broken away showing the initial erection of a carton shell in stage a of formation, FIGURE 10 is a cross-sectional view taken along 10—10 of FIGURE 9 showing a carton shell in stage a of formation, FIGURE 11 is a cross-sectional view taken along line 11—11 of FIGURE 9 showing a carton shell in stage b of formation, FIGURE 12 is a fragmentary perspective view of a carton shell just entering stage c of formation and end flap folding mechanism, FIGURE 13 is a fragmentary perspective view of a shell in stage c of formation and end flap folding mechanism, FIGURE 14 is an elevational view of the drive apparatus for the end flap folding mechanism and for the adhesive application mechanism, FIGURE 15 is a fragmentary perspective view of the adhesive applying mechanism and a shell just before application of adhesive, FIGURE 16 is a fragmentary perspective view of a carton shell having adhesive applied thereon by the adhesive applying mechanism, FIGURE 17 is an elevated view at 90° from FIGURE 14 showing the drive mechanism of the adhesive applying apparatus during application of adhesive, FIGURE 18 is a fragmentary elevational view of a portion of the adhesive applying mechanism just after application of adhesive, FIGURE 19 is a fragmentary elevational view of a tucking finger of a cartoning machine embodying our invention, FIGURE 20 is a fragmentary elevational view of the tucking finger of FIGURE 19 engaging a carton, and FIGURE 21 is a fragmentary cross-sectional view of a sealing apparatus taken along line 21—21 of FIGURE 1 showing a carton in its final stage of formation.

To facilitate the description of our invention, the embodiment illustrated and hereinafter described is adapted to form the particular tamperproof, reclosable carton shown in the drawings. The formation of a carton from a carton shell will be followed from the shell's flattened tubular condition as seen in the carton shell hopper in FIGURE 8 to its completely formed and sealed final condition.

The particular carton shell 30 shown in FIGURES 2–7 has a receptacle portion comprising a hingedly connected leading, trailing and bottom wall 31, 32 and 33 and a pair of leading, trailing and bottom end flaps such as 34, 35 and 36, hingedly connected along associated score lines such as 37, 38 and 39 to the leading, trailing and bottom wall, respectively. Each trailing end flap such as 35 has a protruding tab portion 35a adapted to be inserted into a cutout portion 34a of leading end flaps 34 for interlocking flaps 34 and 35. The carton shell 30 has a cover portion comprising a top wall 40 having a hingedly connected cover panel 41. The cover panel 41 is adhered to the trailing wall 32 and has formed therein a conventional zipper or tear strip to facilitate opening of the carton. A pair of cover end flaps such as 42 are hingedly connected to cover panel 41 and are adapted to overlie the trailing end flaps 35. A pair of top end flaps such as 43 are hingedly connected to top wall 40 and are adapted to overlie the flaps 34, 35 and 42 and to be adhered to flaps 42 to form the corner of the cover portion.

A carton machine embodying our invention and illustrated for purposes of explanation has a main frame, shown generally at 44 in FIGURE 1. The frame 44 is supported for movement by casters 45 and has supporting jacks 46 for immobile support during operation of the machine.

As seen in FIGURES 1, 8 and 9 the frame 44 carries an upright, channel-shaped member 47 which supports a hopper, generally shown at 48. The hopper is of well-known construction and is adapted to releasably hold a supply of carton shells as shown.

Feeding and erecting mechanism

The feeding and erecting mechanism is best seen in FIGURES 8 and 9. As depicted in FIGURE 9 this mechanism removes a carton shell from hopper 48 in flattened tubular condition, erects the shell to stage *a* of formation, and deposits the erected shell on a carton slide plate 49.

The feeder and erection mechanism is of known construction and comprises a plurality of vacuum suction cups 50 for grasping a carton shell 30. A vacuum is created in the cups through flexible suction lines 51 which are connected to a vacuum pump (not shown). The cups 50 are mounted for arcuate movement as shown in phantom in FIGURE 9. A pivotally mounted U-shaped erecting arm 52 erects or squares the carton shell as the suction cups move it toward the carton slide plate 49.

As the suction cups 50 of the feeding and erecting mechanism move shell 30 into close proximity with carton slide plate 49, the bottom wall 33 of the erected shell engages a pair of backstop levers 53, pivoting them downwardly about their pivot pins 54. As the carton shell 30 moves beyond levers 53 and is deposited on the slide plate, the backstop levers 53 are pivoted upwardly by springs 55 and engage the trailing wall 32 of the carton shell 30 to prevent the erected shell from collapsing when the U-shaped erecting arm is returned upwardly toward the hopper.

Conveyor

The carton slide plate 49 comprises a horizontally disposed, smooth-surfaced, metal channel running substantially the length of the machine. The slide plate 49 has a pair of chain tracks 56 and 57, one on each side, which are adapted to receive the top run of a pair of endless conveyor chains 58 and 59. As best seen in FIGURES 9 and 19, the chain 58 is trained over drive sprocket 60 mounted on shaft 62 and an idler sprocket 61 rotatably mounted at the opposite end of the machine. Chain 59 is similarly carried on a pair of corresponding sprockets. FIGURE 10 shows that shaft 62 also carries another sprocket 63 over which is trained an endless drive chain 64 which is driven by a motor (not shown).

The chains 58 and 59 have a plurality of conveyor paddles 65 mounted thereon which are adapted to engage the trailing wall 32 of carton shell 30 to move it forwardly along the carton slide plate 49. The paddles 65 have a pair of arms 65a and 65b that are pivotally secured intermediate their ends to chains 58 and 59, respectively, as by pins 66. A pair of elognate links 67 and 68 are pinned at one end to the lower portion of arms 65a and 65b, respectively. The links are pinned at their opposite ends to the conveyor chains 58 and 59, respectively. These links are of such a length that as they move upwardly around the drive sprocket they cause conveyor paddle 65 to be pivoted into an upright position and hold the paddle in this upright position while the paddle is on the top run of the chains 58 and 59.

As carton shell 30 which has been deposited on carton slide plate 49 in rectangular tubular form is released by suction cups 50 of the feeding and erecting mechanism, a conveyor paddle 65 moves through the U-shaped erecting arm 52 and into engagement with the trailing wall 32 of the carton shell 30 and pushes the blank forwardly along carton slide plate 49. A pair of elongate metal hold down arms 70 and 71 are mounted on frame 30 to engage the top wall 40 of the carton shell 30 to hold the shell down on the slide plate 49.

Product loading

As the carton shell 30 in stage *a* of formation is moved forwardly by paddle 65 toward the product loading area, shown generally at 72 in FIGURE 1, the top end flaps 43 are folded upwardly by top end flap plows 73 and 74 and bottom end flaps 36 are folded downwardly by bottom end flap plows 75 and 76. As seen in FIGURES 9 and 11, a product backstop 78 is mounted on frame 44 opposite the loading side of the machine to prevent the product from being inserted too far. Backstop 78 also folds the leading end flap on the end of the shell opposite the loading end rearwardly. The shell is then in stage *b* of formation as shown in FIGURE 3. The trailing end flap on the end of the shell opposite the loading end is also swung rearwardly by backstop 78 but both flaps are allowed to swing back to their open position substantially transverse to the path of the shell after the shell has moved forwardly beyond backstop 78.

A loading platform 77, as seen in FIGURES 1 and 11, is provided to facilitate the loading of the shell. The product in this case, a loaf of bread, is slid across the loading platform and into the shell. As seen in FIGURES 12 and 13 a product positioning plate 79 is provided on the loading side of the machine to insure that the product has been inserted all the way into the shell 30. The product positioning plate 79 folds the leading and trailing end flaps 34 and 35 at the loading end of the shell rearwardly, but these flaps are also allowed to swing back to their open position substantially transverse to the path of the carton shell after the carton shell has moved forwardly beyond the plate 79.

Leading and trailing end flap folding mechanism

Flap folding mechanism is, of course, provided on both sides of the machine for closing both ends of the shell; however, since the mechanisms are the same, only the folding mechanism on one side will be described to the extent that they are identical.

As seen in FIGURES 12, 13 and 14, the leading end flap folding mechanism comprises an elongate metal plate 80 which is fixedly secured to the frame 44 by brackets 81 and 82. The plate 80 has a forwardly extending portion 80a disposed immediately adjacent the end of a carton shell as the shell passes forwardly on slide plate 49. This portion 80a acts as a guide for the carton shell and acts to hold the end of the carton shell closed after the end flaps have been interlocked. Plate 80 has a rearwardly outwardly flared portion 80b and three rearwardly extending folding fingers 80c, 80d, and 80e. The top and bottom fingers 80c and 80d, respectively, extend rearwardly further than intermediate finger 80e and are adapted to engage the upper and lower portions of leading end flap 34 of shell 30 for folding the leading end flap rearwardly.

The trailing end flap folding mechanism comprises a pair of tucker elements 83 and 84 carried on an endless chain 85 which is trained over a rear idler sprocket 86 and a forward drive sprocket 87 mounted on shafts 88 and 89, respectively. As best seen in FIGURE 14, the tucker elements 83 and 84 are each pinned to chain 85 by a pair of pins such as at 90. The upper run of chain 85 rides over a flat platform 91 fixedly secured to frame 44. Tucker elements 83 and 84 have rider portions 83a and 84a, respectively, adapted to ride on the platform 91 to stabilize the elements in an upright position during their upper run.

The tucker elements 83 and 84 move at a speed which is twice that of the conveyor paddles 65 so that the elements catch up to and overtake the carton shells being transported by paddles 65. The tucker elements move forwardly through the outwardly flared rearward portion 80b of plate 80 and outside of the inwardly disposed, forwardly extending portion 80a and then downwardly around drive sprocket 87 and on around idler sprocket 86 and upwardly to the upper run.

Each tucker element has three closing fingers, such as 83b, 83c and 83d on element 83. The lower finger 83b is adapted to engage the lower portion of trailing end flap 35 and begin to fold it forwardly. Middle finger 83c extends inwardly of finger 83b and has a grooved portion to accommodate intermediate finger 80e of plate 80 as tucker element 83 is moved forwardly. Finger 83c is so disposed as to engage tab portion 35a of trailing end flap 35.

As best seen in FIGURES 12 and 13 tucker elements 83 and 84 are so related to the movement of the carton blanks that as carton shell 30 moves into engagement with fingers 80c and 80d of plate 80 and leading end flap 34 is being folded rearwardly, the tucker element 83 overtakes the shell and swings trailing end flap 35 forwardly, tucking it inside of the rearwardly swinging leading end flap 34. Finger 83c causes the tab portion 35a to follow into the cutout portion 34a of leading end flap 34 to overlie the outside of leading end flap 34.

The upper, inwardly and rearwardly disposed finger 83d swings cover end flap 42 forwardly to overlie the trailing end flap 35. The carton shell 30 is then in stage c of formation as shown in FIGURE 4.

The carton shell 30 then passes forwardly beyond the outwardly flared portion 80b of plate 80 and the interlocked flaps 34 and 35 and flap 42 are folded substantially parallel to the line of travel of the carton shell by the forwardly extending portion 80a of plate 80.

As best seen in FIGURES 14 and 17, the drive sprocket 87 for this trailing flap folding mechanism is driven through mechanism comprising, a second sprocket (not shown) mounted on shaft 89, chain 93, sprockets 94 and 95 mounted on shaft 96, chain 97, sprockets 98 and 99 mounted for rotation on shaft 100, and chain 101 which is trained over a sprocket (not shown) mounted on the same shaft as the conveyor chain idler sprocket 61 at the front end of the machine.

*Adhesive applying apparatus*

Adhesive applying apparatus is provided for applying a pair of strips of adhesive on the carton shell 30 traversely of the straight line path of the shell and a third strip parallel to the path of the shell. In the case illustrated for example, the apparatus is adapted to apply vertically disposed strips of adhesive on the interlocked end flaps 34 and 35 as the carton shell 30 is moving in a straight line path along the horizontally disposed carton slide plate 49.

The adhesive applying apparatus comprises a pair of adhesive dispensing devices, one for each end of the carton shell; however, only one will be described insofar as they are identical.

The adhesive applying mechanism comprises a piston cylinder 102 pivotally mounted at its lower end on frame 44 by pin 103 and bracket 104 for arcuate movement in a plane forming a right angle with the carton slide plate 49. Cylinder 102 has a guide lug 105 at its upper end adapted to slide in a guide bracket 106 secured to frame 44. Bracket 106 has a spring 107 therein, normally urging the cylinder 102 toward the carton slide plate 49.

An elongate piston 108 is slidably received in the cylinder 102 for reciprocable movement and has upper and lower ends protruding out of the cylinder. The upper end of the piston has mounted thereon an applicator head 109 which carries a pair of adhesive dispensing tubes 110 and 111 for applying two strips of adhesive to the end flaps of carton shell 30. Liquid adhesive is supplied to the tubes 110 and 111 respectively through a pair of flexible adhesive supply lines 112 and 113 from an adhesive supply tank 114. Tank 114 has conventional associated pumping mechanism, generally shown at 115 in FIGURE 1, and adhesive guns 112a and 113a for supplying adhesive from tank 114 to tubes 110 and 111.

The lower end of piston 108 is connected to the adhesive applicator drive mechanism for reciprocating the applicator head 109 and associated dispensing tubes 110 and 111. As best seen in FIGURES 14 and 17 the applicator drive mechanism comprises a pair of links 116 and 117 pivotally connected to the lower end of piston 108. This connection is a ball and socket joint for allowing the piston to be pivoted with the cylinder toward and away from the carton slide plate 49. The links 116 and 117 are pinned to crank arm 118 which is keyed at its lower end to shaft 100 for rotation therewith through a relatively small arc.

Crank arm 118 has a cam follower 119 mounted intermediate its ends which is adapted to ride on or follow a cam 120 which is mounted on shaft 96 for rotation therewith. Shaft 96 is rotated by endless drive chain 97 which is trained over a sprocket 95 which is keyed to shaft 96 and over sprocket 98 which is freely mounted on shaft 100 for rotation with respect thereto. Sprocket 98 is driven by smaller sprocket 99 which is part of the same hub on which sprocket 98 is formed. Smaller sprocket 99 is driven by endless chain 101 which in turn is trained over a sprocket (not shown) which is driven by the forward idler sprocket 61 of the main conveyor system.

The counterpart of crank arm 118, crank arm 121, which is also keyed to shaft 100 for rotation therewith, has a spring 122 fastened thereto normally urging crank arm 121 downwardly and consequently the cam follower 119 of crank arm 118 downwardly and against cam 120.

Means are also provided for moving the cylinder 102 about its pivot pin 103, and therefore, applicator head 109, toward and away from the carton slide plate 49. A disc 123 has a camming surface 123a and is mounted on a shaft 124 for rotation therewith. Cylinder 102 has a roller 125 which is adapted to ride on camming surface 123a of disc 123. Shaft 124 is rotated by a sprocket 126 over which endless belt 97 is trained. Thus the disc 123 is driven directly from the chain which drives the cam 120. The piston 108, and consequently applicator head 109, is thus moved in a plane parallel to the straight line path of the carton shell by cam 120 and spring 122, and in a plane perpendicular to the shell path by the camming surface 123a of disc 123 and spring 107.

Adhesive is applied during the upward stroke of piston 108. The configuration and orientation of cam 120 and disc 123 are such that as the cam 120 starts applicator head 109 on its upward movement, the roller 125 is engaged by the raised portion of camming surface 123a as seen in FIGURE 18. During such time as the applicator head 109 is being accelerated to the proper adhesive application speed, the roller 125 rides on the raised portion of camming surface 123a, thus holding the applicator head 109 and associated tubes 110 and 111 out of contact with carton shell 30.

As the cam 120 is rotated farther and the proper, constant, applicator head speed is reached and maintained, the continued rotation of disc 123 allows spring 107 to force the roller 125 to ride inwardly against the depressed portion of camming surface 123a, as best seen in FIGURE 17, thus bringing dispenser tubes 110 and 111 into contact with carton end flaps 34 and 35, respectively. At this time a sensing element 127 which normally protudes upwardly of slide plate 49 through a slot 128 in the plate is engaged and rotated by the carton shell 30. The rotation of sensing element 127 activates a limit switch 129 which is mounted under carton slide plate 49 by bracket 130. The limit switch in turn activates a timer which opens the guns 112a and 113a of the adhesive pumping system for a predetermined period of time and causes adhesive to be dispensed from the tubes 110 and 111 and applied to the end flaps 34 and 35 of carton shell 30.

After adhesive has been dispensed for a predetermined time and the timer has shut off the supply of adhesive to the tubes, the continued rotation of cam 120 causes the applicator head 109 to decelerate during which time the roller 125 rides onto the raised portion of camming surface 123a of disc 123 thus moving the applicator head 109 and dispenser tubes 110 and 111 away from and out of contact with the carton shell 30. The speed of piston 108 is decreased to zero when the cam follower 119 which rides on the surface of cam 120 is tangent to the smallest radius of the cam and instantaneously the direction of movement of the piston 108 is reversed and the piston and applicator head are moved downwardly during which time the roller 125 rides on the raised portion of camming surface 123a of disc 123 and consequently the applicator head is held out of adhesive applying position. As piston 108 reaches the bottom of its stroke its speed is decreased to zero and its upward movement is begun due to the continued rotation of cam 120. The adhesive application cycle then begins again.

It should be noted that if a carton shell is missing on the conveyor, the applicator head goes through its normal cycle of movement, however, since sensing element 127 is not rotated due to the absence of a carton shell, no adhesive is dispensed.

In order to apply a vertically disposed, straight pattern of adhesive on a carton shell moving in a straight line along a horizontal plane it is necessary that the horizontal component of the applicator head speed, during the time of application, be the same as the carton shell speed. Thus, to apply a vertically disposed, straight pattern of adhesive at the rate of $y$ inches per second on a carton shell moving in a straight line path along a horizontal plane at a speed of $x$ inches per second, the applicator head speed, during the period of application, is $\sqrt{x^2+y^2}$ inches per second along a straight line lying in a plane parallel to the path of the shell and forming an acute angle $\theta$ with the horizontal, the cosine of $\theta$ being $x/\sqrt{x^2+y^2}$.

In the particular embodiment shown in the drawings and as best seen in FIGURE 14, the applicator head is adapted to move on a line forming an angle of 45° with the horizontal. This embodiment is adapted to apply a vertically disposed, straight strip of adhesive at the rate of $x$ inches per second on a shell moving horizontally at a speed of $x$ inches per second. The applicator head, during the period of application, moves at an angle of 45° with the horizontal and at a speed of $\sqrt{2x^2}$ inches per second.

If it is desired to put a straight strip of adhesive on a carton shell wherein the strip of adhesive forms an acute angle with the horizontal path of the carton shell, then the applicator head would be moved along a line forming a right angle with the horizontal. In this case, for example, if the horizontal shell speed is $x$ inches per second and it is desired to apply a straight strip of adhesive at the rate of $y$ inches per second at angle of $\alpha$ with the horizontal wherein the cosine of $\alpha = x/y$, then by applicator head speed would be $\sqrt{y^2-x^2}$ inches per second upwardly along a vertical line of travel.

It is understood, of course, that a curved strip of adhesive can be applied by varying the speed of the applicator head.

As best seen in FIGURES 15, 16, and 17, the mechanism is provided with another applicator head 131 having an applicator tube 132 for applying a horizontally disposed straight strip of adhesive to top end flap 43 as the vertically disposed strips are being applied to the end flaps. Applicator head 131 is stationary and fixedly carried on the frame 44 in such a position that tube 132 engages flap 43 which is plowed upwardly by a plow 133. The dispensation of adhesive from tube 132 is controlled by sensing element 129, gun 132a, and pumping mechanism 115. After the adhesive has been applied to carton shell 30, it is in stage $d$ of formation as depicted in FIGURE 5.

*Coding mechanism*

Coding mechanism is provided for indexing the top end flap 43 of the carton shells. Referring to FIGURES 15 and 16 the mechanism comprises an ink reservoir 134, a coding wheel 135, and a supporting wheel (not shown).

As the top end flap moves beyond plow 133 it swings downwardly and passes between the coding wheel 135 and the supporting wheel immediately below the coding wheel. The coding wheel 135 is driven from shaft 124 by chain 136.

*End closing mechanism*

As the carton shell moves beyond the coding mechanism, top end flap 43 is folded downwardly into a position overlying end flap 42 and the top of flaps 34 and 35 by a folding rod 137. The shell is then in stage $e$ of formation as shown in FIGURE 6.

The bottom end flap 36 is then plowed upwardly to a position overlying end flaps 34, 35 and the bottom edge of top end flap 43 by a folding rod 138.

Cover end flap 42 tends to sag as shown in FIGURE 19 because of the bowing of cover panel 41 along the zipper or tear strip. As seen in FIGURES 19 and 20, a tucking finger 139 is provided for engaging cover panel 41, adjacent end flap 42, for straightening panel 41 and swinging flap 42 upwardly to the position shown in FIGURE 20 to square the carton. The carton is then in stage $f$ of formation shown in FIGURE 7.

Finger 139 is mounted in hub 140 which is carried on a shaft 141 rotatably mounted in frame 44. Shaft 141 is driven from the coding mechanism drive by chain 142.

*Sealing device*

The completely closed carton then passes into the sealing device, generally shown at 143 in FIGURES 1 and 21. The device has a pair of endless conveyor belts 144 and 145 trained over rollers which are rotatably carried by supports such as shown at 146 in FIGURE 1. The ends of a carton such as 30 are engaged by the belts which move the carton forwardly on a pair of rails 147 and 148 and a support plate 149. The belts are held against the carton by heating blocks such as 150 and 151 which are supported by arms 152 and 153, respectively. The arms 152 and 153 are pivotally mounted by pins 154 and 155 to carriages 156 and 157 respectively. The arms are adjusted to a vertical position by adjusting screws 158 and 159 which are held under tension by springs 160 and 161. The arms are locked against outward pivoting by limiting screws 162 and 163. The sealing device is designed to handle a variety of different size cartons and to vary the pressure exerted on the cartons. Carriages 156 and 157 are threaded on shaft 164, carriage 156 being threaded on right hand threads 164a and carriage 157 being threaded on left hand threads 164b so that when shaft 164 is turned in one direction the carriages 156 and 157 are moved inwardly toward each other to facilitate the sealing of small cartons and when the shaft is turned the other way the arms move away from each other for sealing larger cartons. Conventional drive means (not shown) are provided for driving the endless belts 144 and 145.

When the carton 30 moves off sealing device 143, it is filled, completely closed, sealed, and ready for shipment to the consumer.

While an illustrative embodiment of the invention is shown in the drawings and described in detail herein, the invention is susceptible of embodiments in many different forms and it should be understood that the present disclosure is to be considered as an exemplification of the principles of the invention and is not intended to limit the invention to the embodiment illustrated. The scope of the invention will be pointed out in the appended claims.

We claim:

1. In a cartoning machine having conveyor means for moving a carton shell at a predetermined speed on a straight line path along a plane, said shell having a poriton disposed substantially parallel to said path and substantially perpendicular to said plane, an adhesive dispenser adapted to move in timed relation to the speed of the shell along a line of travel substantially traversely of the straight line path of said shell for applying a strip of adhesive on said portion traversely of the straight line path of said shell.

2. In a cartoning machine having conveyor means for moving a carton shell at a predetermined speed along a straight line path; a frame; a first adhesive dispenser mounted on said frame for applying a strip of adhesive on said shell parallel to said straight line path; and a second adhesive dispenser carried on said frame for movement along a line of travel traversely of said straight line path for simultaneously applying a strip of adhesive on said shell traversely of said first strip, said second dispenser having a component of movement parallel to and in the same direction as the movement of said shell.

3. In a cartoning machine having conveyor means for moving a carton shell at a selected speed on a straight line of travel along a plane, said carton shell having an end flap disposed substantially parallel to said straight line of travel and substantially at a right angle to said plane, adhesive applying apparatus comprising: an adhesive dispenser adapted to move in timed relation with the moving shell along a line of travel forming an acute angle with the line of travel of said carton shell for applying a strip of adhesive to said end flap traversely of the line of travel of said carton, said dispenser having a component of movement parallel to and in the same direction as the movement of said carton shell.

4. In a cartoning machine having a conveyor for moving a carton shell along a straight line path at a speed of $x$ inches per second; means for applying a straight line strip of adhesive at the rate of $y$ inches per second on said carton shell at a right angle to the straight line path of said carton shell, said means comprising an adhesive dispenser adapted to move at the speed of $\sqrt{x^2+y^2}$ inches per second along a straight line of travel forming an acute angle with the straight line path of said carton shell, the cosine of said acute angle being $x/\sqrt{x^2+y^2}$, said dispenser having a component of movement parallel to and in the same direction as the movement of said carton shell.

5. In a cartoning machine having a conveyor for moving a carton shell along a straight line path at a speed of $x$ inches per second; means for applying a straight line strip of adhesive at the rate of $y$ inches per second on said carton shell at an acute angle with the straight line path of said carton shell, said means comprising an adhesive dispenser adapted to move at the speed of $\sqrt{y^2-x^2}$ inches per second along a straight line of travel forming a right angle with the straight line path of said carton shell.

6. In a cartoning machine having conveyor means for moving a carton shell at a selected speed on a straight line of travel along a substantially horizontal plane, said carton shell having a panel disposed substantially parallel to said line of travel and lying in a substantially vertical plane, adhesive applying apparatus, comprising: a frame; a piston cylinder mounted on said frame; a piston adapted to reciprocate in said cylinder along a line of travel forming an acute angle with the line of travel of said carton shell, said piston having an upper and lower end; drive means linked to the lower end of said piston for reciprocating said piston in said cylinder; and an adhesive applicator head mounted on the upper end of said piston for applying a substantially vertically disposed strip of adhesive on said panel as the carton shell moves along said horizontal plane.

7. In a cartoning machine having conveyor means for moving a carton shell at a predetermined speed on a straight line path, said shell having a leading and a trailing wall and leading and trailing end flaps hingedly connected along associated score lines to said leading and trailing walls, respectively, said end flaps extending traversely of the straight line path of said carton shell, apparatus for closing the end of said carton shell, comprising: a frame; means mounted on said frame for swinging said leading end flap rearwardly about its associated score line to a position substantially parallel to the straight line path of said carton shell; and trailing flap tucking means carried by said frame for swinging said trailing end flap about its associated score line and tucking a portion of said trailing end flap inside of said leading end flap as the leading end flap is being swung into its position parallel to the straight line path of the carton shell.

8. In a cartoning machine having a conveyor for moving a carton shell at a predetermined speed on a straight line path, said shell having a leading and a trailing wall and leading and trailing end flaps hingedly connected along associated score lines to said leading and trailing walls, respectively, said end flaps extending substantially traversely of the straight line path of said carton shell, apparatus for closing the end of said carton shell, comprising: a frame; first means fixedly mounted on said frame for swinging said leading end flap rearwardly about its associated score line to a position substantially parallel to the straight line path of said carton shell; and trailing end flap tucking means carried on said frame for movement along a line of travel substantially parallel to said straight line path of said carton shell and at a greater speed than said carton shell for swinging said trailing end flap forwardly about its associated score line and tucking a portion thereof inside of said leading end flap as the leading end flap is being swung to its position substantially parallel to the straight line path of said carton shell.

9. In a cartoning machine having a conveyor for moving a carton shell at a predetermined speed on a straight line path along a horizontal plane, said shell having a leading, trailing, and bottom wall, and leading, trailing, and bottom end flaps hingedly connected along associated score lines to said leading, trailing and bottom walls respectively, said leading and trailing end flaps extending traversely of said straight line path, apparatus for closing the end of said shell, comprising: a frame; means fixedly mounted on said frame for swinging said leading end flap rearwardly about its associated score line to a position substantially parallel to the straight line path of said shell; trailing flap tucking means carried on said frame for movement in the same direction as said carton shell and in a line of travel parallel to the straight line path of said shell and at a greater speed than said shell for swinging said trailing end flap forwardly about its associated score line and tucking a portion of said trailing end flap inside of said leading end flap as the leading end flap is being swung to its position parallel to the straight line path of said shell; means for applying substantially vertically disposed strips of adhesive on said leading and trailing end flaps; and means for swinging said bottom end flap upwardly about its associated score line and into engagement with said strips of adhesive for adhering said bottom end flap to said leading and trailing end flaps.

10. A cartoning machine for forming a sealed carton from a flattened tubular carton shell, said shell having leading, trailing, top, and bottom walls, a cover panel hinged to said top wall and adhered to said trailing wall, said cover panel having a tear strip extending substantially the length thereof, a leading end flap hinged along one edge to said leading wall, said leading end flap having a cutout portion opposite its hinged edge, a trailing end flap hinged along one edge to said trailing wall, said trailing end flap having a tab portion opposite its hinged end, a cover end flap hingedly connected to said cover panel and being adapted to overlie said trailing end flap, a top end flap hingedly connected to said top wall and being adapted to overlie said cover end flap, and a bottom end flap hingedly connected to said bottom wall, said machine comprising: a frame; a horizontally disposed carton slide plate; a hopper for releasably holding a supply of said flattened tubular carton shells; means for removing a carton shell from said hopper and erecting it into rectangular tubular form and depositing same on said carton slide plate with said leading and trailing walls and said leading, trailing, and cover end flaps vertically disposed and extending traversely of said carton slide plate; conveyor means for moving said carton shell at a selected speed on a straight line path along said horizontally disposed carton slide plate; means mounted on said frame for swinging said leading end flap rearwardly about its hinged edge to a position substantially parallel to the straight line path of said carton shell; tucking means carried by said frame for swinging said trailing end flap forwardly about its hinged edge and tucking a portion of said trailing end flap inside of said leading end flap as the leading end flap is being swung to its position parallel to the straight line path of said carton shell, said tucking means causing said tab portion to follow into said cutout portion and overlie said leading end flap; means for folding said cover end flap forwardly to overlie said trailing end flap; means for applying vertically disposed straight strips of adhesive to said leading and trailing end flaps; means for applying a strip of adhesive to said top end flap in the area adapted to overlie said cover end flap; means for folding said top end flap into engagement with said cover end flap to adhere said top end flap to said cover end flap; and means for folding said bottom end flap upwardly into engagement with said vertically disposed straight strips of adhesive for adhering said bottom end flap to said leading and trailing end flaps to form a sealed carton.

11. In a method of forming a carton from a carton shell, the steps of: moving the shell at a predetermined speed along a straight line path; and applying a strip of adhesive on said shell traversely of said straight line path by moving an adhesive dispensing applicator head in timed relation to the speed of the shell along a line of travel traversely of said straight line path.

12. In a method of forming a carton from a carton shell, the steps of: moving the shell along a straight line path at a speed of $x$ inches per second; and applying a straight line pattern of adhesive at the rate of $y$ inches per second on said carton shell at a right angle to said straight line path by moving an adhesive dispenser at the speed of $\sqrt{x^2+y^2}$ inches per second along a straight line of travel forming an acute angle with said straight line path, the cosine of said acute angle being $x/\sqrt{x^2+y^2}$ said dispenser having a component of movement parallel to and the same direction as the movement of said carton shell.

13. In a method of forming a carton from a carton shell, the steps of: moving the carton shell along a straight line path at a speed of $x$ inches per second; and applying a straight line strip of adhesive at a rate of $y$ inches per second on said carton shell at an acute angle with the straight line path of said carton shell by moving an adhesive dispenser at the speed of $\sqrt{y^2-x^2}$ inches per second along a straight line of travel forming a right angle with the straight line path of said carton shell.

14. In a method of forming a carton from a carton shell having a leading, trailing, and bottom wall and leading, trailing, and bottom end flaps hingedly connected along associated score lines to said leading, trailing and bottom wall, respectively; the steps of: moving said carton shell at a predetermined speed along a straight line path; folding said leading end flap rearwardly about its associated score line to a position substantially parallel to the straight line path of said carton shell; folding said trailing end flap forwardly about its associated score line and tucking a portion of said trailing end flap inside of said leading end flap as the leading end flap is being swung to its position parallel to the straight line path of said carton shell; applying vertically disposed strips of adhesive on said leading and trailing end flaps; and folding said bottom end flap upwardly about its associated score line into engagement with said strips of adhesive for adhering said bottom end flap to said leading and trailing end flaps.

15. In a cartoning machine having means for moving a carton shell along a predetermined path the combination comprising means for dispensing an adhesive and a mechanism for moving said means transversely with respect to said path whereby said means applies adhesive to said carton shell transversely with respect to the movement of said carton shell along said path.

References Cited by the Examiner
UNITED STATES PATENTS 2,230,963 2/1941 MacDonald.
2,471,452 5/1949 Rosen.

BERNARD STICKNEY, *Primary Examiner.*